Patented Sept. 24, 1940

UNITED STATES PATENT OFFICE 2,216,095

INSOLUBLE ALIPHATIC ETHERS OF CELLULOSE

Edgar C. Britton and Kenneth G. Harding, Midland, Mich., assignors to The Dow Chemical Company, Midland, Mich., a corporation of Michigan No Drawing. Application January 26, 1939, Serial No. 252,870

9 Claims. (Cl. 260—231)

This invention relates to new and useful cellulose ethers, and particularly to a type of cellulose ether which is insoluble in the usual organic solvents for cellulose alkyl ethers.

The new ethers with which the invention is concerned are prepared by reacting alkali cellulose or a mixture of alkali and partially etherified cellulose, with beta-beta'-dichloroethyl ether. The new products may also be prepared by reacting an alkali cellulose with a mixture of beta-beta'-dichloroethyl ether and another etherifying agent such as an alkyl halide, alkyl sulfate, or aralkyl halide. The ethers or mixed ethers of cellulose produced by any of the reactions outlined above are substantially insoluble in the usual solvents for the alkyl ethers of cellulose. That is, such cellulose ethers do not dissolve in alcohol, toluene, butyl acetate, or like common single or mixed solvents. They are also insoluble in cuprammonium solution, cold 72 per cent sulfuric acid, or water. They dissolve with total decomposition in hot 72 per cent sulfuric acid or in cold concentrated (96 per cent) sulfuric acid.

The new insoluble aliphatic ethers of cellulose are preferably prepared at from about 90° to about 150° C. from an alkali cellulose containing alkali and water in proportions which have been found satisfactory for the preparation of solvent-soluble alkyl ethers of cellulose. The alkali and water content of the alkali cellulose employed is preferably in proportion representing an alkali concentration at least as great as 50 per cent. The ratio of alkali to cellulose, in other words, should preferably be greater than that of water to cellulose in the alkali cellulose employed. If such an alkali cellulose were reacted with ethyl chloride or similar alkylating agent, the alkyl ether of cellulose would be a solvent-soluble product. Under like conditions of etherification, when the etherifying agent is beta-beta'-dichloroethyl ether, the aliphatic ether of cellulose produced may have from 1 to as high as 2 to 2.4 or more of the hydroxyl groups in the anhydro-glucose unit substituted by the etherifying agent. This latter degree of substitution (2–2.4 substituent groups per mol) in the case of the alkyl ethers of cellulose would produce a solvent-soluble product.

The following examples illustrate the preparation and set forth some of the properties of our new products:

EXAMPLE 1

*Insoluble cellulose ethers from alkali cellulose*

An alkali cellulose suitable for etherification was prepared by shredding together 200 grams of a high alpha-cellulose wood pulp, 600 grams of a 50 per cent sodium hydroxide solution, and 110 grams of flake sodium hydroxide. Shredding was conducted with cooling for about 2 hours. The alkali cellulose contained 43.9 per cent sodium hydroxide, 20.0 per cent cellulose, and 36.1 per cent water. 730 grams of this alkali cellulose and 2000 grams of beta-beta'-dichloroethyl ether were heated in a sealed reaction vessel to a temperature of 120° C. for 6 hours. At the end of this time, about 75 per cent of the sodium hydroxide had been neutralized by the reaction. The product was removed from the reaction vessel, freed from unchanged dichloroethyl ether, salt, and by-product, and was found to weigh about 210 grams, representing an increase in weight of 43.8 per cent, based on the cellulose present in the alkali cellulose charged into the reaction vessel. The product was insoluble in the usual organic solvents for cellulose ethers, including alcohol, toluene, butyl acetate, dioxan, and the like. It was also insoluble in 72 per cent sulfuric acid at room temperature and showed no evidence of dissolving in cuprammonium reagent.

EXAMPLE 2

In a similar manner, 200 grams of high alpha-cellulose wood pulp was shredded for 2½ hours in a water-cooled shredder with 340 grams of 50 per cent sodium hydroxide solution, and 230 grams of flake sodium hydroxide. The product contained 49 per cent sodium hydroxide, 24.7 per cent cellulose, and 26.3 per cent water. 150 grams of this product was heated in a pressure vessel with 925 grams of beta-beta'-dichloroethyl ether at 100° to 110° C. for 48 hours. At the end of this time, 85 per cent of the sodium hydroxide originally present had been reacted on. When freed from alkali, salt, excess etherifying agent, and by-product, the cellulose derivative obtained weighed 46.7 grams, which was an increase of about 26.5 per cent over the weight of the cellulose in the original charge. This product was substantially like that obtained in Example 1, being insoluble in the usual cellulose ether solvents, as well as in cuprammonium reagent. A sample of the product was extracted in a Soxhlet extractor with dioxan, and after 20 hours exhibited a loss in weight of less than 1 per cent.

EXAMPLE 3

*Ethylation of an insoluble aliphatic ether of cellulose*

200 grams of an insoluble aliphatic ether of cellulose, prepared from dichloroethyl ether in substantially the manner described in the foregoing examples, was shredded with 600 grams of 50 per cent sodium hydroxide solution and 110 grams of flake sodium hydroxide. The final shredded material so obtained contained 44.2 per cent sodium hydroxide, 22.0 per cent cellulosic material, and 33.8 per cent water. 883 grams of this mixture was charged into a pressure vessel along with 2300 grams of ethyl chloride. The vessel was sealed and heated to 115° C. for 8 hours, at the end of which time about 42 per cent of the sodium hydroxide present had been reacted on by the ethyl chloride. The product obtained after being freed from excess etherifying agent, salt, by-product, and the like, weighed 224 grams. The new mixed cellulose ether was very insoluble in the common solvents for alkyl ethers of cellulose under ordinary conditions, although a small proportion (10 per cent, or less) could be removed over a period of 24 hours by extraction in a Soxhlet, using dioxan as the solvent.

EXAMPLE 4

*Etherification of ethyl cellulose with dichloroethyl ether*

An ethyl cellulose containing about 2 ethoxyl groups per glucose unit was mixed with sodium hydroxide in the ratio 65 grams of ethyl cellulose and 375 grams of 50 per cent sodium hydroxide. The mixture, together with 1800 grams of beta-beta'-dichloroethyl ether, was placed in a pressure vessel and heated to 100° C. for 27½ hours. 76 grams of a mixed ether product was obtained which was insoluble in a mixture of 80 parts of benzene and 20 parts of ethanol by volume, as well as in dioxan and cold benzyl alcohol. The mixed ether swelled considerably and was partially soluble in benzyl alcohol at 100° C. It was insoluble in cuprammonium reagent and in cold 72 per cent sulfuric acid. The product so prepared was similar in many respects to that obtained in the process described in Example 3.

EXAMPLE 5

*Preparation of insoluble mixed ethers of cellulose employing mixed etherifying agents*

About 200 grams of a high grade cotton linters, 600 grams of a 50 per cent sodium hydroxide solution, and 110 grams of flake sodium hydroxide were shredded together for 2½ hours in a shredder through the jacket of which water at from 0° to 10° C. was circulated. The so-formed alkali cellulose contained 41.6 per cent sodium hydroxide, 19.2 per cent cellulose, and 39.2 per cent water. 800 grams of this alkali cellulose was reacted with 1000 grams of beta-beta'-dichloroethyl ether and 1500 grams of ethyl chloride in a sealed pressure vessel at a temperature of 115° to 120° C. for a period of 8 hours. At the end of this time 98.8 per cent of the sodium hydroxide had been reacted. The cellulose ether product obtained weighed 238 grams representing an increase of 54.5 per cent based on the weight of cellulose charged into the etherifying vessel. The alkoxyl content of the mixed cellulose ether, calculated as ethoxyl, was 43.2 per cent. The product was insoluble in acetic acid, 80:20-benzene: ethanol, chlorobenzene, benzyl alcohol, butyl alcohol, butyl acetate, dioxan, cuprammonium reagent, or cold 72 per cent sulfuric acid.

The foregoing examples have illustrated the preparation of insoluble aliphatic ethers and mixed ethers of cellulose employing beta-beta'-dichloroethyl ether as the etherifying agent. It is to be understood that the corresponding bromo compound (beta-beta'-dibromoethyl ether) may be employed with similar results. Likewise, other symmetrical dihalogen substituted alkyl ethers producible from the olefine halohydrins may be employed to produce insoluble aliphatic ethers of cellulose. Examples of the symmetrical dihalogen substituted aliphatic ethers which may be so employed include, in addition to the beta-beta'-dihalogen ethyl ether, beta-beta'-dihalogen propyl ether, dihalogen isopropyl ether, etc. The mixed cellulose ethers may be prepared equally as well by the alkylation of the new insoluble cellulose ethers, or by the further etherification of partially etherified alkyl or aralkyl ethers of cellulose, or by the etherification of alkali cellulose with a mixture of a dihalogen substituted alkyl ether and one of the better known etherifying agents.

While we are not restricted to any theory as to the mechanism of reaction whereby the new ethers are produced, and while no positive chemical identification of the product has been made, there is evidence to indicate that at least part of the dihalogen substituted aliphatic ethers react with the alkali cellulose somewhat as follows:

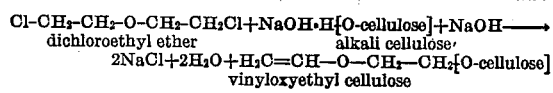

If, as suggested above, the dichloroethyl ether reacts to form a vinyloxyethyl ether of cellulose, the insolubility of the product may be predicated upon a presumption that such an unsaturated cellulose ether probably polymerizes concurrently with the etherification reaction. This hypothesis is substantiated in part by our finding that insoluble aliphatic ethers of cellulose having the properties of those described herein, may be prepared by reacting alkali cellulose and beta-chloroethyl vinyl ether.

Other modes of applying the principle of our invention may be employed instead of those explained, change being made as regards the method herein disclosed, provided the method or reagents stated by any of the following claims or the equivalent of such stated method or reagents be employed.

We therefore particularly point out and distinctly claim as our invention:

1. The method of making cellulose ethers, which comprises interacting a symmetrical dihalogen-substituted alkyl ether containing at least 2 carbon atoms in the alkyl group, and a mixture comprising sodium hydroxide, water and a material selected from the group consisting of cellulose and partially etherified cellulose.

2. The method of making cellulose ethers, which comprises interacting alkali cellulose suitable for etherification and a symmetrical dihalogen-substituted alkyl ether containing at least 2 carbon atoms in the alkyl group.

3. The method of making cellulose ethers, which comprises interacting a symmetrical dihalogen-substituted alkyl ether containing at least 2 carbon atoms in the alkyl group, and a mixture comprising sodium hydroxide, water and a partially etherified cellulose.

4. The method of making cellulose ethers which comprises interacting an alkali cellulose suitable for etherification and beta-beta'-dihalogen ethyl ether.

5. The method of making cellulose ethers, which comprises interacting an alkali cellulose suitable for etherification and beta-beta'-dichloroethyl ether.

6. A cellulose ether characterized by insolubility in water, cuprammonium, and cold 72 per cent sulphuric acid, and substantial insolubility in the usual organic solvents for alkyl ethers of cellulose, and being substantially identical with the product obtained by the method of claim 2.

7. An aliphatic ether of cellulose characterized by insolubility in water, cuprammonium, and cold 72 per cent sulphuric acid, and substantial insolubility in the usual organic solvents for alkyl ethers of cellulose, and being substantially identical with the product obtained by the method of claim 5.

8. A mixed ether of cellulose, characterized by insolubility in water, cuprammonium, and cold 72 per cent sulphuric acid, and substantial insolubility in the usual organic solvents for alkyl ethers of cellulose, and being substantially identical with the product obtained by the method of claim 3.

9. A vinyloxy ethyl ether of cellulose being substantially identical with the product obtained by the method of claim 5.

EDGAR C. BRITTON.
KENNETH G. HARDING.